3,749,755
THERMOPLASTIC MOLDING COMPOSITIONS OF HIGH IMPACT RESISTANCE
Klaus Bronstert, Carlsberg, Franz Schmidt, Mannheim, and Wilhelm Schuette, Ludwigshafen, Germany, assignors to Badische Anilin- & Soda-Fabrik Aktiengesellschaft, Ludwigshafen (Rhine), Germany
No Drawing. Filed Dec. 16, 1970, Ser. No. 98,895
Claims priority, application Germany, Dec. 22, 1969,
P 19 64 156.6
Int. Cl. C08f *19/08, 19/10*
U.S. Cl. 260—876 R          2 Claims

ABSTRACT OF THE DISCLOSURE

Thermoplastic molding compositions of improved impact resistance and based on a mixture of an oxymethylene polymer and an elastomeric graft copolymer.

---

This invention relates to thermoplastic molding compositions of high impact resistance based on oxymethylene polymers and elastomeric graft copolymers.

Oxymethylene polymers are plastics materials of high rigidity and tensile strength. However, shaped articles made from molding compositions consisting of oxymethylene polymers show relatively low impact resistance. The addition of polyhydric alcohols such as glycerol or trimethylol propane or the addition of carboxyamides increases the impact resistance but lowers to a considerable extent the rigidity and tensile strength properties. Also, polyurethanes, the addition of which to oxymethylene polymers is described in U.K. Pat. 1,017,744, lower rigidity and tensile strength and moreover adversely affect the stability, particularly against discoloration due to heat and light.

In U.K. Pat. 1,179,135 butadiene/acrylonitrile copolymers and polyacrylic esters are recommended as additives. Such additives lower the thermal stability of the molding compositions and cause considerable discoloration during processing.

It is an object of the invention to provide molding compositions based on oxymethylene polymers which show high impact resistance and still retain high rigidity and tensile strength, whilst exhibiting high thermal stability and virtually no discoloration during processing.

These and other objects are achieved by a highly impact-resistant thermoplastic molding composition which is characterized in that it contains (A) an oxymethylene polymer and
(B) an elastomeric graft copolymer having a glass transition temperature below $-20°$ C., the ratio of A to B being from 97:3 to 50:50, by weight.

It is believed that the said graft copolymer imparts the said highly advantageous properties to the poly(oxymethylene) molding composition.

The molding compositions of the present invention contain, as main component A, an oxymethylene polymer. As oxymethylene polymers, all of the usual thermoplastic oxymethylene polymers, that is both homopolymers and copolymers of oxymethylene, are suitable. Of the homopolymers those products are preferred which have end groups stabilized by esterification or some other conventionally protected chain ends. Preferred oxymethylene copolymers contain, in addition to oxymethylene groups, up to 30% by weight, for example from 0.1 to 25% by weight, of oxyalkylene groups, for example oxyethylene, trimethylene oxide or, preferably, tetramethylene oxide groups in the molecule to a fair degree of random distribution. Terpolymers are also suitable. For information on the manufacture of oxymethylene polymers, which are in most cases cheap commercial products, reference is made to Marshall Sittig, Polyacetal Resins, Gulf Publishing Co., Houston, 1963. We prefer to use oxymethylene polymers having melting points above 130° C.

The important feature of the novel molding compositions is the presence therein of component B, that is, of an elastomeric or rubbery graft copolymer having a glass transition temperature below $-20°$ C. By graft copolymer we mean a product obtained by polymerizing one or more olefinically unsaturated monomers in the presence of a preformed polymer such that a substantial proportion of the monomer is grafted onto the prepolymer molecule. The manufacture of such graft copolymers is known to those skilled in the art, for example from R. J. Ceresa, "Block and Graft Copolymers" (Butterworth, London, 1962).

Suitable graft copolymers for the present process are those conventional graft copolymers having elastomeric properties and a glass transition temperature of less than $-20°$ C., especially between $-150°$ and $-20°$ C., preferably between $-80°$ and $-30°$ C. The glass transition temperature as described e.g. by Nielsen, Mechanical Properties of Polymers, N.Y., 1962, may be determined by the method described in ASTM Standards D832 and D1053. As regards the determination to the above-mentioned properties of the molding compositions, reference is made to ASTM Standards D746, D797, D676 and other methods conventionally used for determining the mechanical properties of polymers.

In the manufacture of elastomeric graft copolymers the starting material may be, for example, a (preferably elastomeric) prepolymer (1) made from
  (a) 10 to 99% by weight of an acrylic ester of a $C_1$ to $C_{15}$ alcohol,
  (b) 1 to 90% by weight of a monomer carrying two olefinic double bonds and
  (c) optionally up to 25% by weight of at least one further monomer.

The one or more monomers as hereinafter described under (2), (3) and (4) are then grafted onto this prepolymer (1), that is, the monomers (2), (3) and (4) are polymerized in the presence of the prepolymer (1). An advantageous graft copolymer is obtained, for example, when using a prepolymer (1) consisting of (a) from 10 to 99% by weight, preferably from 30 to 98% by weight, more preferably from 50 to 98% by weight, of an acrylic ester of an alcohol having from 1 to 10 carbon atoms, preferably from 4 to 8 carbon atoms, such as butyl acrylate, octyl acrylate or ethylhexyl acrylate,
(b) from 1 to 90% by weight, preferably from 2 to 70% by weight and more preferably from 2 to 50% by weight of a monomer carrying two olefinic double bonds, such as a 1,3-diene (butadiene, isoprene or 2,3-dimethylbutadiene) or a diene with non-conjugated double bonds (e.g. vinyl cyclohexene or cyclo-octadiene-1,5) or an acrylic ester derived from an unsaturated alcohol such as vinyl acrylate or tricyclodecenyl acrylate, obtained from dicyclopentadiene, and
(c) optionally up to 25% by weight of at least one other conventional monomer such as a vinyl ether, a vinyl ester, a vinyl halide, and a vinyl-substituted heterocyclic compound such as vinyl pyrrolidone, the percentages given under (a), (b) and (c) adding up to 100%.

It is believed that component (b) is essential for the subsequent grafting. The double bonds introduced into the prepolymer with the component (b) are thought to serve (to an extent varying with their reactivity) as grafting sites, at which the polymer molecule subsequently grows.

The said prepolymer (1) then serves as a substrate to which there are grafted (per 100 parts of prepolymer)

(2) from 10 to 85 parts by weight, in particular from 20 to 70 parts by weight, of styrene, methyl methacrylate or mixtures thereof, and (3) optionally up to 35 parts by weight, conveniently (its styrene is used as a monomer (2)) from 10 to 50% by weight, of the styrene, of acrylonitrile or methacrylonitrile, and (4) optionally up to 20 parts by weight of further monomers such as acrylic esters, vinyl esters, vinyl ethers, vinyl halides, or vinyl-substituted heterocyclic compounds such as vinyl pyrrolidone.

Advantageously, the graft copolymer contains a considerable proportion of polar groups, that is, it is convenient to select as a graft copolymer a product containing more than 10% by weight of polymerized units of methacrylates or acrylates and methacrylonitrile or acrylonitrile. Where the proportion of (meth)acrylic esters is more than 70% by weight, building units composed of methacrylonitrile or acrylonitrile may conveniently be omitted.

The preparation of the prepolymers and also of the graft copolymers is carried out by conventional techniques, preferably by emulsion polymerization using conventional free-radical-generating initiators, emulsifiers and chain stoppers in aqueous emulsion or dispersion. The manufacture of suitable graft copolymers is described, for example, in U.S. Pat. 3,280,219.

The novel molding compositions contain components A and B in a ratio of from 97:3 to 50:50, preferably from 95:5 to 70:30 and more preferably from 95:5 to 80:20, by weight.

Manufacture is effected by blending the two components. It is advantageous to mix the components as intimately as possible. Even though the components A and B do not as a rule show unlimited intersolubility such that the molding compositions are not homogeneous mixtures, they should appear to be homogeneous when viewed macroscopically.

For example, the polymers A and B may be blended in the form of powders on mixing rolls or in an extruder, for example a twin-worm extruder. Blending may be carried out, if desired, immediately before conversion to shaped articles. The components are conveniently mixed at temperatures above the melting point or softening range of the oxymethylene polymer, for example at temperatures ranging from 170° to 240° C.

The molding compositions conveniently contain conventional antioxidants, heat stabilizers, optionally light stabilizers, dyes, pigments, fillers and reinforcing agents such as are usually incorporated in oxymethylene polymers or the graft copolymers.

MANUFACTURE OF TWO RUBBERY GRAFT COPOLYMERS

Graft copolymer I 170 g. of butyl acrylate and 170 g. of butadiene are heated in 1,500 g. of water at 65° C. with stirring, 12 g. of the sodium salt of a paraffin sulfonic acid ($C_{12}$ to $C_{18}$), 3 g. of potassium persulfate, 3 g. of sodium bicarbonate and 1.5 g. of sodium pyrophosphate being added thereto. After polymerization has commenced there is added a mixture of 430 g. of butyl acrylate and 230 g. of butadiene over 5 hours. When the addition of all monomers is complete, the reaction mixture is held at 65° C. for a further 2 hours. There is thus obtained an approximately 40% solids aqueous polymer dispersion. 250 g. of the dispersion of polymer (A) are mixed with a mixture of styrene and acrylonitrile present in a ratio of 75:25 by weight and 375 g. of water and the whole is polymerized with stirring at 70° C. Polymerization initiators used are 0.5 g. of potassium persulfate and 1.75 g. of lauroyl peroxide dissolved in the mixture of styrene and acrylonitrile. There is thus obtained an aqueous (approximately 40%) solids polymer dispersion. The aqueous dispersion is dried, in this case as in the case described below, by stirring 2 parts by volume of the dispersion into 3 parts by volume of methanol at 50° C. and leaving the mixture to stand for about 1 hour, whereupon it is purified by decantation and repeated washing and filtering from methanol and finally dried.

Graft copolymer II 100 g. of butyl acrylate, 20 g. of tricyclodecenyl acrylate, 10 g. of the sodium salt of a paraffin sulfonic acid ($C_{12}$ to $C_{18}$), 3 g. of potassium persulfate and 1,480 g. of distilled water are heated to 60° C. with stirring. After polymerization has commenced, 900 g. of butyl acrylate are added over a period of about 1 hour. Polymerization is allowed to continue for a further 2 hours and there is thus obtained a polymer dispersion containing about 40% solids (a).

465 g. of styrene and 200 g. of acrylonitrile are polymerized in the presence of 2,500 g. of dispersion, 2 g. of potassium persulfate, 1.33 g. of lauroyl peroxide and 1,005 g. of distilled water at 60° C. with stirring. There is thus obtained an approximately 40% solids dispersion which is worked up as described above.

EXAMPLE 1

8,500 g. of a polyoxymethylene copolymer consisting of 97% of trioxane and 3% of dioxolane and containing 0.55% of a condensate of isophthalic diamide, ethylene urea and formaldehyde and 0.45% of 2,2'-methylene-bis-(4-methyl-6-t-butylphenol) are blended with 1,500 g. of a graft rubber (I) on a conventional mixing apparatus, and the mixture is melt kneaded on a Werner & Pfleiderer twin-screw extruder and converted to granules suitable for injection molding applications. This molding composition is subjected to impact resistance tests and is found to have an impact resistance of 50 cm. kg., the starting material not containing the graft rubber having an impact resistance of approximately 1.5 cm. kg.

EXAMPLES 2 AND 3

Molding compositions prepared in the same manner as described in Example 1 but containing 10 and 20% by weight respectively of graft rubber (I) have impact resistances of 30 and 70 cm. kg. respectively.

EXAMPLE 4

9,000 g. of a polyoxymethylene copolymer consisting of 97% of trioxane and 3% of butanediol formal and containing about 3% of unpolymerized trioxane and from 3 to 4% of degradable portions, are intimately mixed with 1,000 g. of graft rubber (I), 50 g. of a condensate of isophthalic diamide, ethylene urea and formaldehyde, 40 g. of 2,2'-methylene-bis-(4-methyl-6-t-butylphenol), 1.5 g. of soda and 2 g. of NaF in the form of powders, and the resulting mixture is compounded on a devolatilizing screw extruder of the "Welding" type in a single operation to form stable granules.

Circular discs are molded from the granules and these show an impact resistance of 40 cm. kg.

The impact resistance of the polyoxymethylene copolymer worked up in the same manner but without the addition of the rubber is less than 2.0 cm. kg.

EXAMPLE 5

A molding composition prepared as described in Example 1 but containing 20% of graft copolymer (II) has an impact resistance of 30.0 cm. kg.

COMPARATIVE EXAMPLE (CF. EXAMPLE 1)

A molding composition is made by the method described in Example 1 but using 10% of a commercially available polyurethane elastomer (TEXIN E 204, Mobay Chemical Co.) in place of the graft copolymer (I) and an impact resistance of 15.0 cm. kg. is found. The molding composition is subject to strong discoloration when exposed to light or heat.

Influence of processing on properties of molding composition

To show the influence of mixing intensity on the mechanical behavior of the polymer mixture, a molding composition prepared as described in Example 1 is divided into two parts, one part being compounded on a "Welding" twin-screw extruder whilst the other part is compounded on a single-screw extruder, to form granules in both cases.

Circular discs are made by injection molding and the following impact resistances are found:

|  | Cm. kg. |
|---|---|
| Material compounded on twin-screw | 50 |
| Material compounded on single-screw | 20 |
| Starting material not containing rubber | 1.5 |

EXAMPLE 6

1,700 g. of a copolymer of 97% of trioxane and 3% of 1,3-dioxacycloheptane hydrolytically freed from unstable portions by dissolution in a mixture of approximately equal parts of water and methanol in the presence of sodium fluoride under pressure at 150° C., were well mixed in the dry state with 300 g. of the graft copolymer (I) above and 10 g. of a condensate of isophthalic diamide, ethylene urea and formaldehyde and 8 g. of 2,2'-methylene-bis-(4-methyl-6-t-butylphenol). The mixture was converted to granules on a small twin-screw extruder heated at 210° C. with devolatilization. The granules were tested for stability by heating at 222° C. for 2 hours under nitrogen, the result being a loss of weight of 0.3%. The impact resistance was found to be 47.5 cm. kg.

EXAMPLE 7

In a comparative test, stable polyoxymethylene copolymer consisting of 97% of trioxane and 3% of butanediol formal and containing a thermal stabilizer and an antioxidant, as described in Example 1, is mixed with 7.5% of dry graft copolymer (I), 7.5% of the commercial rubber "Paracril B" or 5% of commercial rubber "Paracril AJ," compounding being effected on a twin-screw extruder in both cases. The mixtures obtained as granules are then injection molded to circular discs of diameter 60 mm. and thicknesses of 1 and 2 mm. (plastics temperature 200° C., mold temperature 110° C.).

A comparative impact resistance test as carried out in Example 1 gives similar impact resistance values for the individual materials.

In order to test the properties of the materials after exposure to elevated temperatures, circular discs having a thickness of 1 mm. are subjected to high-temperature aging at 130° C. in an air-circulating oven.

10 discs of each material are freely suspended in the oven by means of metal clips and the determination of their loss of weight and discoloration is carried out at certain time intervals. After treatment for 7 days (168 hours) the discs are bent to determine whether embrittlement has taken place or not. The discoloration is given in the following table according to the Yellowness Index (YI) described in ASTM D 1925/63 T.

The results are given in the following table.

TABLE

| Heating period (hours) | Containing 7.5% of Copolymer I of invention | | Containing no additive | | Containing 7.5% of "Paracril B" | | Containing 7.5% of "Paracril AJ" | |
|---|---|---|---|---|---|---|---|---|
|  | Weight loss, percent | YI | Weight loss, percent | YI | Weight loss, percent | YI | Weight loss, percent | YI |
| 0 | 0 | 11.3 | 0 | 6.2 | 0 | 26.2 | 0 | 25.9 |
| 4 | 0.26 | 14.0 | 0.30 | | 0.33 | 30.4 | 0.34 | 33.9 |
| 9 | 0.28 | 15.5 | 0.30 | 8.3 | 0.39 | 34.0 | 0.35 | 39.4 |
| 24 | 0.40 | 18.9 | 0.41 | 11.9 | 0.56 | 44.3 | 0.51 | 52.5 |
| 33 | 0.49 | 24.0 | 0.45 | | 0.74 | 49.7 | 0.62 | 60.0 |
| 48 | 0.51 | 27.0 | 0.47 | 13.7 | 0.84 | 56.6 | 0.87 | 63.4 |
| 72 | 0.56 | 29.8 | 0.53 | 19.6 | 1.12 | 67.5 | 1.42 | 72.3 |
| 96 | 0.60 | 36.1 | 0.56 | 20.8 | 1.29 | 70.2 | 2.17 | 82.1 |
| 168 | 0.71 | 47.9 | 0.56 | 31.6 | 1.79 | 91.8 | 3.22 | 83.9 |
| (168) | (1) | (1) | (1) | (1) | (2) | (2) | (2) | (2) |

[1] No embrittlement.
[2] Embrittlement.

We claim:
1. Thermoplastic molding composition of high impact resistance comprising a mixture of
   (A) an oxymethylene polymer and
   (B) an elastomeric graft copolymer having a glass transition temperature below −20° C., obtained by polymerizing
      (2) from 10 to 65 parts by weight of styrene and/or methyl methacrylate,
      (3) optionally up to 35 parts by weight of acrylonitrile or methacrylonitrile and
      (4) optionally up to 20 parts by weight of further monomers in the presence of
      (1) 100 parts by weight of a polymer obtained by polymerizing
         (a) from 10 to 99% by weight of an acrylic ester of a $C_1$ to $C_{15}$ alcohol,
         (b) from 1 to 90% by weight of a monomer having two olefinic double bonds and
         (c) optionally up to 25% by weight of further monomers,
the percentages given under (a), (b) and (c) adding up to 100%; the ratio of A to B being from 97:3 to 50:50, by weight.

2. A thermoplastic molding composition as described in claim 1 wherein said component B is a graft copolymer obtained by polymerizing
   (2) from 10 to 65 parts by weight of styrene, methyl methacrylate or mixture thereof,
   (3) optionally up to 35 parts by weight of acrylonitrile or methacrylonitrile and
   (4) optionally up to 20 parts by weight of further monomers in the presence of
   (1) 100 parts by weight of a prepolymer obtained by polymerizing
      (a) from 30 to 98% by weight of an acrylic ester of an alcohol having from 1 to 10 carbon atoms,
      (b) from 2 to 70% by weight of a monomer having two olefinic double bonds and
      (c) optionally up to 25% by weight of a further copolymerizable monomer, the percentages given under (a), (b) and (c) adding up to 100%.

References Cited

UNITED STATES PATENTS

| | | | |
|---|---|---|---|
| 3,250,823 | 5/1966 | Zeltlin | 260—876 |
| 3,476,832 | 11/1969 | Pritchard | 260—887 |
| 3,555,121 | 1/1971 | Tanaka et al. | 260—887 |
| 3,398,074 | 8/1968 | Eguchi et al. | 260—887 |
| 3,642,940 | 2/1972 | Burg et al. | 260—876 |
| 3,642,946 | 2/1972 | Grabowski | 260—876 |
| 3,652,726 | 3/1972 | Nield et al. | 260—876 |
| 3,663,471 | 5/1972 | Schirmer et al. | 260—876 |

FOREIGN PATENTS

| | | | |
|---|---|---|---|
| 1,124,911 | 8/1968 | Great Britain | 260—876 |

JOHN C. BLEUTGE, Primary Examiner

U.S. Cl. X.R.

260—45.95, 849, 851, 855, 879, 880, 881, 885